United States Patent [19]

Hunt et al.

[11] Patent Number: 5,029,971

[45] Date of Patent: Jul. 9, 1991

[54] OPTICAL FIBRE LOCATING APPARATUS

[75] Inventors: Michael H. Hunt, Ipswich, England; Iain D. Miller, Glasgow, Scotland

[73] Assignee: British Telecommunications public limited company, United Kingdom

[21] Appl. No.: 469,484

[22] PCT Filed: Feb. 27, 1989

[86] PCT No.: PCT/GB89/00203

§ 371 Date: Apr. 11, 1990

§ 102(e) Date: Apr. 11, 1990

[87] PCT Pub. No.: WO89/08275

PCT Pub. Date: Sep. 8, 1989

[30] Foreign Application Priority Data

Mar. 2, 1988 [GB] United Kingdom ............... 8805015

[51] Int. Cl.[5] .......................... G02B 6/26; G02B 6/30
[52] U.S. Cl. .................. 350/96.2; 350/96.17
[58] Field of Search ............. 350/96.20, 96.21, 96.22, 350/96.10, 96.17

[56] References Cited

U.S. PATENT DOCUMENTS

| 4,296,997 | 10/1981 | Malsot et al. | 350/96.20 |
| 4,333,705 | 6/1982 | Mead | 350/96.20 |
| 4,714,315 | 12/1987 | Krause | 30/96.20 |
| 4,767,174 | 8/1988 | Carenco et al. | 350/96.20 |
| 4,916,497 | 4/1990 | Gaul et al. | 350/96.17 X |
| 4,966,433 | 10/1990 | Blonder | 350/96.17 |
| 4,973,133 | 11/1990 | Matz et al. | 350/96.17 X |

FOREIGN PATENT DOCUMENTS

| 2311325 | 12/1976 | France | 350/96.17 X |
| 58-21890 | 2/1983 | Japan | 350/96.17 X |
| WO87/02474 | 4/1987 | World Int. Prop. O. | 350/96.20 X |
| WO87/02518 | 4/1987 | World Int. Prop. O. | 350/96.12 X |

OTHER PUBLICATIONS

Bailliet et al., "Coined Precision Mount for Fiber-Optic . . .", I.B.M. Tech. Discl. Bull., vol. 25, No. 8, 1/83, pp. 4261–4262.

Primary Examiner—Brian Healy
Attorney, Agent, or Firm—Nixon & Vanderhye

[57] ABSTRACT

Fibre locating apparatus to facilitate alignment of an optical fibre comprises accurately aligned silica blocks (1,2 and 3) respectively providing a fibre guiding 'V' groove (4), a perpendicular facing surface (10) and a mounting (7) for a mirror or other planar signal receiving surface. The apparatus allows rapid realignment of fibre ends when optical systems (e.g. fibre lasers) require reconfiguration.

8 Claims, 1 Drawing Sheet

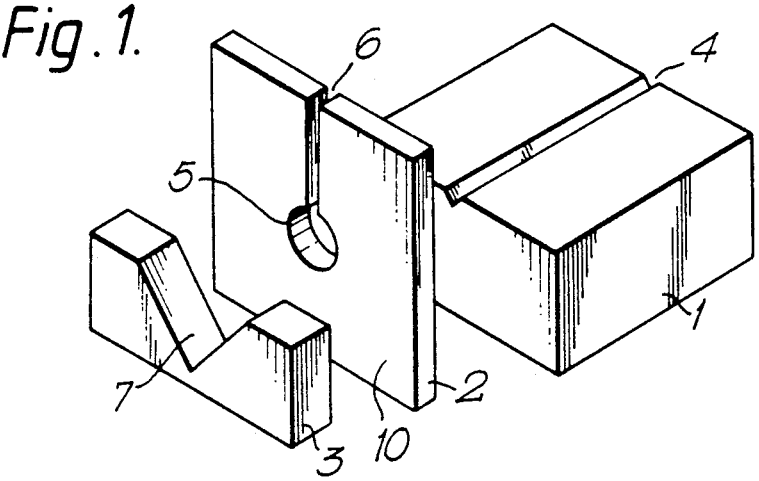
Fig.1.
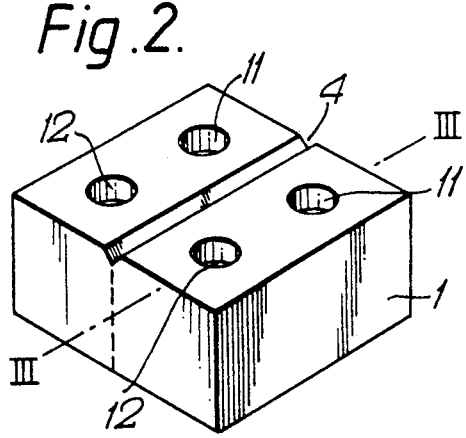
Fig.2.
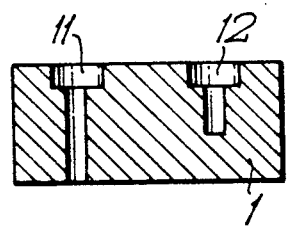
Fig.3.
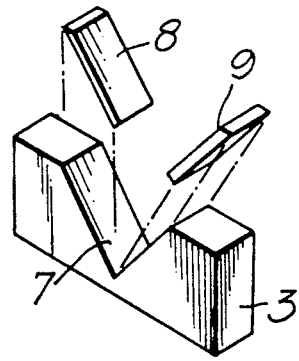
Fig.4.
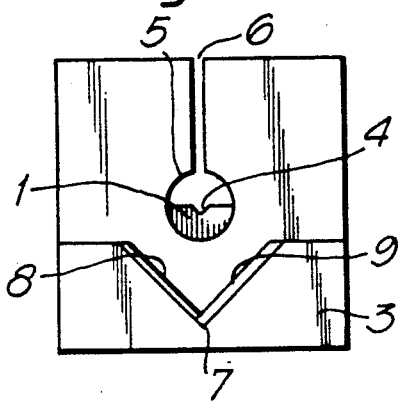
Fig.5.
Fig.6.

OPTICAL FIBRE LOCATING APPARATUS

BACKGROUND OF THE INVENTION

The present invention relates to optical fibre locating apparatus and in particular to such apparatus for locating an optical fibre with respect to a planar surface.

Techniques for cleaving optical fibres to ensure that the cleaved end is perpendicular are now well established. In setting up optical apparatus such as fibre lasers or fibre amplifiers it is often necessary to align the fibre with a planar member such as a semi-transmitting mirror or a cover shield. Such alignment requires extreme accuracy and may involve minute adjustments using several micrometer screws. As may be appreciated this set-up procedure can take several hours.

Accordingly if a system requires reconfiguration, for example, to use a different fibre or to change the transmission frequency of a mirror a large time overhead may be incurred.

SUMMARY OF THE INVENTION

It is an object of the present invention to provide optical fibre locating apparatus which significantly reduces the difficulty of aligning a fibre end with a planar surface.

According to the present invention there is provided optical fibre locating apparatus comprising first block means having a guide surface which includes a longitudinal 'V' groove adapted to receive and guide an optical fibre, a second block means having a facing surface perpendicular to the guide surface, the second block means including an aperture through which an end of an optical fibre may pass, and mounting means adapted to support apparatus presenting a planar surface whereby contacting the facing surface with such planar surface and feeding a fibre along the 'V' groove facilitates alignment of an end of such fibre with such planar surface.

Preferably each of the block means comprises a silica block.

The mounting means may comprise a further block having a 'V' shaped channel adapted to receive a slide in block having a signal receiving planar surface. The V shaped channel may be offset with respect to the aperture whereby the signal receiving point of the planar surface may be varied.

BRIEF DESCRIPTION OF THE DRAWINGS

Optical fibre locating apparatus in accordance with the invention will now be described by way of example only with reference to the accompanying drawing of which:

FIG. 1 is a perspective view of the component parts of the apparatus prior to final assembly;

FIG. 2 is a perspective view of one of the parts of FIG. 1 showing a further detail;

FIG. 3 is a part cross sectional view on the line III—III of FIG. 2; FIG. 4 is a perspective view of another of the parts of FIG. 1 showing a manufacturing detail;

FIG. 5 is a front elevation of the apparatus of FIG. 1 after final assembly; and FIG. 6 is a side elevation of the apparatus of FIG. 1 after final assembly.

DETAILED DESCRIPTION OF A PREFERRED EMBODIMENT OF THE INVENTION

Referring to the drawing the support comprises three accurately machined silica blocks, 1, 2 and 3 which are guide together using ultra violet cured adhesive.

The fibre support block 1 includes an accurate 'V' groove 4 which acts as fibre guide. To ensure accuracy of the 'V' groove 4, particularly in regard to the angle at the base of the 'V' this block is in practice machined from two blocks which are subsequently glued together in the manner described in our European Patent Application No. 86302785.0 (Publication No. 200414). For use with currently available optical fibres the block 1 is approximately twenty millimeters wide, twenty millimeters long and ten millimeters deep, the 'V' groove running along the centre line of the block and having an upper width of 0.177 millimeters.

The facing block 2, approximately twenty millimeters deep and two millimeters long has a four millimeter aperture 5 drilled through centred on the centrelines of the vertical face. A one millimeter wide channel 6 is provided to facilitate entry of a fibre end (not shown) through the aperture 5.

The mounting block 3, approximately seven millimeters deep and four millimeters long includes a 'V' shaped channel 7 which is arranged to receive either circular or rectangular mirrors or cover slides commonly used in fibre laser or amplifier systems for laboratory use. The block 3 is machined to provide a 'V' groove centred on the centre line and having a width at the upper end of 12.06 millimeters and at an angle to the vertical of 45 degrees.

The block is completed by using silica inserts 8 and 9 which are glued in position the block 9 being two millimeters thick and the block 8 one millimeter thick. By using differing thicknesses of insert the 'V' groove is shifted off centre with respect to the groove 4 so that if for example a circular mirror is used then rotating same in the channel 7 results in a different portion of the receiving surface being presented.

The forward face 10 of the block 2 is lapped and polished to ensure that it is precisely perpendicular to the 'V' groove A. Thus, in use, a mirror (or other planar receiving surface) is placed in the 'V' 7 and abutted to the surface 10. Since the surface 10 is precisely perpendicular to the V groove a fibre edged forward along the groove in the direction of the mirror using a single advancing micrometer for example will abut the planar surface as accurately as the perpendicularly of the cleaving of the end of the fibre.

Optical fibre has sufficient resilience to permit slight over advancement (i.e. causing the fibre to bend slightly on abutment) the fibre readily returning to alignment when withdrawn slightly). Index matching fluid may be used on the fibre end if necessary to cater for any slight deviation from the perpendicularly of the cleaver. Referring specifically now to FIGS. 2 and 3, the block 1 may be provided with aperture 11 to enable screw mounting of the support assembly to another surface. It is here noted that the apertures 11 include a countersunk section so that if screws are used the head comes below the surface to avoid accidental breakage of fibres by snagging.

A further pair of apertures 12, one on each side of the 'V' groove 4 are also provided. These apertures 12 each receive an insert of magnetic stainless steel. This enables retention of a fibre in position by use of a flexible magnetic strip which may be laid over the fibre and 'V' groove 4.

Although as herein the apparatus is manufactured of silica other materials (e.g. aluminum) could be used. One advantage of silica is that thermal expansion effects on optical fibres are less likely to cause a system to move out of adjustment if the thermal co-efficients of the mounting and the fibre are compatible.

A further advantage of silica block is noted particularly in laboratories in that in the event of stray laser light striking the block it will be scattered rather than reflected, thus reducing (as may occur with metallic blocks) the likelihood of accidental eye damage in persons working in such environments.

For the avoidance of doubt although metric dimensions have been given throughout to facilitate construction of apparatus in accordance with the invention, it is here noted that such dimensions are exemplary and should not be construed as limiting the invention.

We claim:

1. Optical fibre locating apparatus comprising:
   first block means having a guide surface which includes a longitudinal 'V' groove adapted to receive and guide an optical fibre in the bottom of the groove,
   a second block means having a facing surface distal from and perpendicular to the guide surface, the second block means including an aperture through which an end of an optical fibre may pass, and
   mounting means adapted to support apparatus presenting a planar surface
   whereby contacting the facing surface with such planar surface. and feeding a fibre along the 'V' groove facilitates perpendicular alignment of an end of such fire with such planar surface.

2. Optical fibre locating apparatus comprising:
   first block means having a guide surface which includes a longitudinal 'V' groove adapted to receive and guide an optical fibre,
   a second block means having a facing surface perpendicular to the guide surface, the second block means including an aperture through which an end of an optical fibre may pass, and
   mounting means comprising third block means including a 'V' shaped channel and adapted to support apparatus presenting a planar surface
   whereby contacting the facing surface with such planar surface and feeding a fibre along the 'V' groove facilitates alignment of an end of such fibre with such planar surface.

3. Optical fibre locating apparatus as in claim 2 wherein the V shaped channel is offset with respect to the aperture whereby a circular signal receiving object may be rotated such that the part on the planar surface at which light emitting from a fibre is received may be varied.

4. Optical fibre locating apparatus as in claim 1, wherein the first block means includes holding means arranged to retain a fibre in the V groove.

5. Optical fibre locating apparatus comprising:
   first block means having a guide surface which includes a longitudinal 'V' groove adapted to receive and guide an optical fibre, said first block means including holding means arranged to retain a fibre in the V groove, said holding means including magnetically responsive material disposed on each side of the 'V' group and a flexible strip of magnetic material,
   a second block means having a facing surface perpendicular to the guide surface, the second block means including an aperture through which an end of an optical fibre may pass, and
   mounting means adapted to support apparatus presenting a planar surface
   whereby contacting the facing surface with such planar surface and feeding a fibre along the 'V' groove facilitates alignment of an end of such fibre with such planar surface.

6. Optical fibre locating apparatus as in claim 5 wherein the magnetically responsive material comprises magnetic stainless steel inserts located in apertures included in the first block means.

7. Optical fibre apparatus comprising:
   first block means having a guide surface which includes a longitudinal 'V' groove adapted to receive and guide an optical fibre,
   a second block means having a facing surface perpendicular to the guide surface, the second block means including an aperture through which an end of an optical fibre may pass, and
   mounting means adapted to support apparatus presenting a planar surface
   wherein contacting the facing surface with such planar surface and feeding a fibre along the 'V' groove facilitates alignment of an end of such fibre with such planar surface; and
   wherein each block means is a silica block.

8. Optical fibre locating apparatus comprising:
   a first block having a linearly extending groove therein for receiving an optical fibre therewithin having a longitudinal optical fibre axis parallel to said groove;
   a second block disposed adjacent said first block and having a facing surface disposed perpendicular to said groove; and
   an optical apparatus mount disposed to retain an optical apparatus having a planar face in contact with said facing surface and therefore also perpendicular to an optical fibre axis and parallel with a cleaved end of an optical fibre disposed in said groove.

* * * * *